(12) United States Patent
Eichenberger et al.

US007730463B2

(10) Patent No.: US 7,730,463 B2
(45) Date of Patent: Jun. 1, 2010

(54) EFFICIENT GENERATION OF SIMD CODE IN PRESENCE OF MULTI-THREADING AND OTHER FALSE SHARING CONDITIONS AND IN MACHINES HAVING MEMORY PROTECTION SUPPORT

(75) Inventors: Alexandre E. Eichenberger, Chappaqua, NY (US); Kai-Ting Amy Wang, North York (CA); Peng Wu, Mount Kisco, NY (US); Peng Zhao, East York (CA)

(73) Assignee: International Business Machines Corporation, Armonk, NY (US)

( * ) Notice: Subject to any disclaimer, the term of this patent is extended or adjusted under 35 U.S.C. 154(b) by 1137 days.

(21) Appl. No.: 11/358,372

(22) Filed: Feb. 21, 2006

(65) Prior Publication Data
US 2007/0226723 A1    Sep. 27, 2007

(51) Int. Cl.
*G06F 9/45* (2006.01)
(52) U.S. Cl. .................. 717/136; 717/149; 717/150; 717/151; 712/20; 712/21; 712/22
(58) Field of Classification Search ............... 717/3, 717/106, 109, 136, 137, 149–151, 154–156, 717/159–161; 712/6, 20–22, 42, 217, 224, 712/241
See application file for complete search history.

(56) References Cited
U.S. PATENT DOCUMENTS

| 5,522,074 | A * | 5/1996 | Endo ........................... 717/150 |
| 6,098,162 | A * | 8/2000 | Schiffleger et al. ............. 712/4 |
| 6,106,575 | A * | 8/2000 | Hardwick .................... 717/119 |
| 6,113,650 | A * | 9/2000 | Sakai .......................... 717/160 |
| 6,289,434 | B1 * | 9/2001 | Roy ............................ 712/32 |
| 6,334,176 | B1 * | 12/2001 | Scales et al. .................... 712/4 |
| 7,219,212 | B1 * | 5/2007 | Sanghavi et al. ............... 712/6 |
| 7,249,350 | B2 * | 7/2007 | Wang et al. .................. 717/136 |
| 7,302,557 | B1 * | 11/2007 | Hwu et al. ................... 712/241 |

(Continued)

OTHER PUBLICATIONS

Gerald Cheong et al., An Optimizer for Multimedia Instruction Sets, Aug. 14, 1997, Stanford University (Cheong_1997.pdf).*

(Continued)

*Primary Examiner*—Wei Y Zhen
*Assistant Examiner*—Hiren Patel
(74) *Attorney, Agent, or Firm*—Yee & Associates, P.C.; Libby Z. Toub

(57) ABSTRACT

A computer implemented method, system and computer program product for automatically generating SIMD code. The method begins by analyzing data to be accessed by a targeted loop including at least one statement, where each statement has at least one memory reference, to determine if memory accesses are safe. If memory accesses are safe, the targeted loop is simdized. If not safe, it is determined if a scheme can be applied in which safety need not be guaranteed. If such a scheme can be applied, the targeted loop is simdized according to the scheme. If such a scheme cannot be applied, it is determined if padding is appropriate. If padding is appropriate, the data is padded and the targeted loop is simdized. If padding is not appropriate, non-simdized code is generated based on the targeted loop for handling boundary conditions, the targeted loop is simdized and combined with the non-simdized code.

21 Claims, 8 Drawing Sheets

U.S. PATENT DOCUMENTS

| | | | | |
|---|---|---|---|---|
| 7,313,788 | B2* | 12/2007 | Ben-David et al. | 717/150 |
| 2002/0083292 | A1* | 6/2002 | Isomura et al. | 711/203 |
| 2003/0233643 | A1* | 12/2003 | Thompson et al. | 717/161 |
| 2004/0003381 | A1* | 1/2004 | Suzuki et al. | 717/150 |
| 2004/0006667 | A1* | 1/2004 | Bik et al. | 711/100 |
| 2005/0273769 | A1* | 12/2005 | Eichenberger et al. | 717/136 |
| 2005/0273770 | A1* | 12/2005 | Eichenberger et al. | 717/136 |
| 2006/0111881 | A1* | 5/2006 | Jackson | 703/2 |

OTHER PUBLICATIONS

Eichenberger et al. Vectorization for SIMD Architectures with Alignment Constraints, Jun. 9, 2004, ACM, (Eichenberger_2004.pdf).*

Wu Peng et al. Efficient SIMD Code Generation for Runtime Alignment and Length Conversion, 2005, IBM T.J. Watson Research Center, (Efficient SIMD code.pdf).*

Rau Ramakrishna, Iterative Modulo Scheduling, Nov. 1995, Hewlett Packard, (Rau.pdf).*

Ho et al. "Managing Side Effects on Shared Data", University of California at Berkeley, 1993, (Ho_Kinson.pdf, pp. 210-211, 221).*

* cited by examiner

SHIFTING b[1] RIGHT BY 4 BYTES IS EQUIVALENT TO SHIFTING b[-1] LEFT BY 12 BYTES

SHIFTING c[3] LEFT BY 4 BYTES IS THE SAME AS SHIFTING c[1] BY 4 BYTES

EFFICIENT GENERATION OF SIMD CODE IN PRESENCE OF MULTI-THREADING AND OTHER FALSE SHARING CONDITIONS AND IN MACHINES HAVING MEMORY PROTECTION SUPPORT

This invention was made with Government support under the National Security Agency, Contract No. H98230-04-C-0920. THE GOVERNMENT HAS CERTAIN RIGHTS IN THIS INVENTION.

BACKGROUND OF THE INVENTION

1. Field of the Invention

The present invention relates generally to the data processing field and, more particularly, to a computer implemented method, system and computer program product for automatically generating SIMD code, particularly in the presence of multi-threading and other false sharing conditions, and in machines having a segmented/virtual page memory protection system.

2. Description of the Related Art

Modern processors are using Single Issue Multiple Data (SIMD) units with greater frequency in order to increase processing power without having to significantly increase issue bandwidth, since SIMD units allow multiple data units to be processed in one computation. Although SIMD units can be programmed by hand, especially for dedicated libraries and a small number of kernels, the performance impact of SIMD units will likely remain limited until compiler technology permits automatic generation of SIMD code, referred to hereinafter as "simdization", for a wide range of applications.

One salient feature of modern processors that has had a strong impact on SIMD code generation is support for multi-threading and parallelism, referred to herein as "MT". A characteristic of MT that is particularly relevant to simdization is that multiple threads can cooperate to generate results, for example, by working on independent computations stored in distinct memory locations. This aspect of MT becomes problematic if false sharing is introduced when simdizing the code, i.e., when two different threads read/modify/write distinct memory locations that happen to be collocated within the same single unit of SIMD memory access (e.g., 16 bytes for VMX, SSE-2 and others). This issue is a correctness issue since the final outcome of a program depends on the order in which the multiple threads access such "falsely shared" unit of memory.

False sharing may also occur on machines without support for multi-threading as an artifact of the compiler being insufficiently aware, due to lack of information flow and/or imprecise information, of multiple distinct data structures residing within the same unit of SIMD memory access. In such a situation, the compiler might think that accesses to two distinct data structures, for example, the last element of a data array A and the first element of a data array B, where data arrays A and B are collocated in memory, can be interchanged; when in fact, this is not the case because the two references have a false sharing situation (for example, the last element of A and the first element of B reside in the same 16 byte unit of memory). Hereinafter, such compiler scheduling issues are specifically referred to as "CS".

When referring to either the CS or the MT cases, the "FS" label (for False Sharing issue) is used.

Another salient feature of modern processors that has had a strong impact on SIMD code generation is support for segmented/virtual page memory protection systems, referred to herein as "MPS". The characteristic of MPS most relevant with respect to simdization is that memory accesses beyond a memory segment are required to generate a memory violation (e.g. for program integrity). This requirement will cause a problem if the generated SIMD code accesses memory locations that are beyond the range of locations touched by the original, non-simdized code. This is not a program correctness issue, as in the case of a false sharing condition, because the values of the additional memory locations touched by the simdized code are not used to modify permanent program state. The sole issue in this situation is that such memory locations should not be addressed at all as they may be outside of their memory segments.

In general, generating SIMD code without being aware of the possibility of multi-threading and other false sharing conditions can result in code that incorrectly halts or that generates incorrect results. In a similar manner, generating SIMD code without being aware of MPS may result in code that incorrectly halts.

SUMMARY OF THE INVENTION

The present invention provides a computer implemented method, system and computer program product for automatically generating SIMD code, particularly in the presence of multi-threading and other false sharing conditions, and in machines having a segmented/virtual page memory protection system. In one aspect, the present invention is directed to a computer implemented method for automatically generating SIMD code. The method begins by analyzing data to be accessed by a targeted loop that includes at least one statement, where each statement has at least one memory reference, to determine whether memory accesses are safe. Responsive to a determination that memory accesses are safe, the targeted loop is simdized. Responsive to a determination that memory accesses are not safe, it is determined whether a scheme can be applied in which safety does not need to be guaranteed. Responsive to a determination that a scheme in which safety does not need to be guaranteed can be applied, the scheme is applied and the targeted loop is simdized according to the applied scheme. Responsive to a determination that a scheme in which safety does not need to be guaranteed cannot be applied, a determination is made whether padding is appropriate. Responsive to a determination that padding is appropriate, the data is padded and the targeted loop is simdized. Responsive to a determination that padding is not appropriate, non-simdized code is generated, based on the targeted loop, for handling boundary conditions. The targeted loop is simdized, and the simdized targeted loop is combined with the non-simdized code.

In one embodiment, the step of generating non-simdized code, based on the targeted loop, for handling boundary conditions is carried out by generating at least one of prologue sequential code and epilogue sequential code to handle boundary conditions in the presence of false sharing conditions. Preferably, prologue sequential code is generated only when memory accesses are not safe for an initial set of iterations of the original targeted loop, and epilogue sequential code is generated only when memory accesses are not safe for a final set of iterations of the original targeted loop.

In one particular embodiment, generation of prologue sequential code and/or epilogue sequential code (as applicable) is carried out by copying each necessary statement from the targeted loop and distributing each such copied statement within the prologue sequential code and/or the epilogue sequential code to corresponding distinct loops and causing each distinct loop to iterate precisely over an appropriate number of iterations for that loop's copied statement.

In one particular embodiment, prologue sequential code and/or epilogue sequential code is generated by copying each necessary statement from the targeted loop and generating a single loop for the prologue sequential code and/or the epilogue sequential code. In such an embodiment, each such single loop contains each copied statement and further contains, for each copied statement, a corresponding conditional statement guarding the copied statement. Each such conditional statement has a condition that determines precisely which iteration of the copied statement guarded by that conditional statement is executed.

In one particular embodiment, prologue sequential code and/or epilogue sequential code is generated by copying each necessary statement from the targeted loop and generating a single loop for the prologue sequential code and/or the epilogue sequential code. In this embodiment, each such single loop contains each copied statement and further contains, only for each copied statement for which re-execution of that statement would affect an outcome of the targeted loop, a corresponding conditional statement guarding the copied statement. Each such conditional statement has a condition that determines precisely which iteration of the copied statement guarded by that conditional statement is executed.

In one embodiment, the scheme in which safety does not need to be guaranteed is a scheme in which a memory location analysis is performed to determine if all of the memory references are relatively aligned and, if it is determined that all of the memory references are relatively aligned, the targeted loop is simdized. Preferably, if it is determined that all of the memory references are not relatively aligned, it is then determining whether alignment of the memory references can be determined statically. If it is determined that alignment of the memory references can be determined statically, the targeted loop is simdized using statically determined memory references to prevent unnecessary loads. Still more preferably, if it is determined that alignment of the memory references cannot be determined statically, it is then determined whether modified stream shifting is appropriate. If it is determined that modified stream shifting is appropriate, the targeted loop is simdized and it is then determined which statements within the targeted loop include a stream shifting operation, and each such statement in a first and last simdized iteration of the simdized targeted loop is modified by replacing each stream shifting operation within each such statement with a modified stream shifting operation that results in one of two safe situations. The first safe situation is one in which any data located in any memory reference accessed by the modified stream shifting operation is actually used and is guaranteed to be safe. The second safe situation is one in which any data located in any memory reference accessed by the modified stream shifting operation is discarded without having an adverse impact on any result of the simdized targeted loop.

In one embodiment, the step of generating non-simdized code based on the targeted loop for handling boundary conditions includes a step of applying memory access guarding to at least one of a prologue statement and an epilogue statement for handling boundary conditions in the presence of a memory protection support system.

In another aspect, the present invention is directed to a computer program product comprising a computer usable medium having computer usable program code configured for automatically generating SIMD code in accordance with the above-described method.

In a still further aspect, the present invention is directed to a system for automatically generating SIMD code according to the above-described method.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
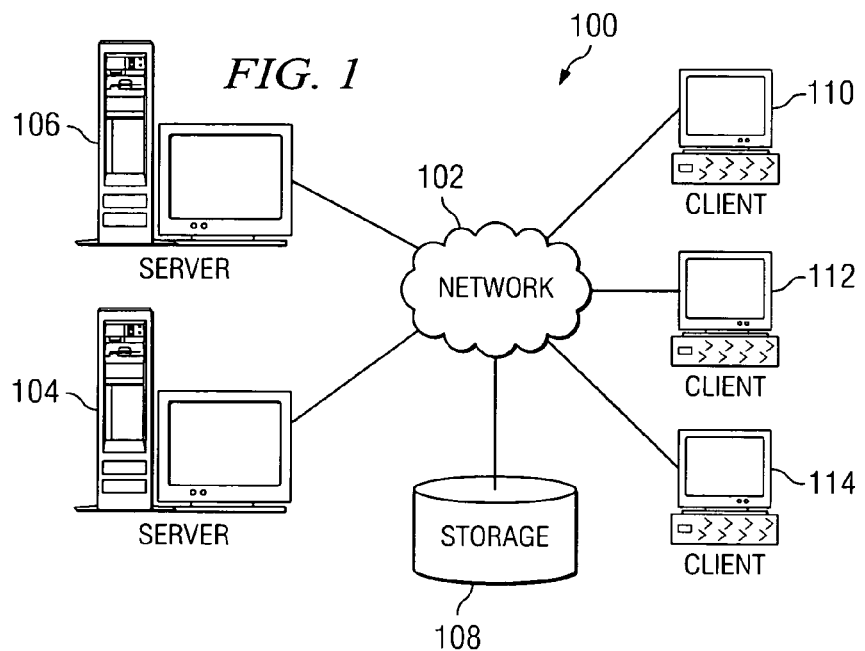
FIG. 1 depicts a pictorial representation of a network of data processing systems in which aspects of the present invention may be implemented.
Figure 2:
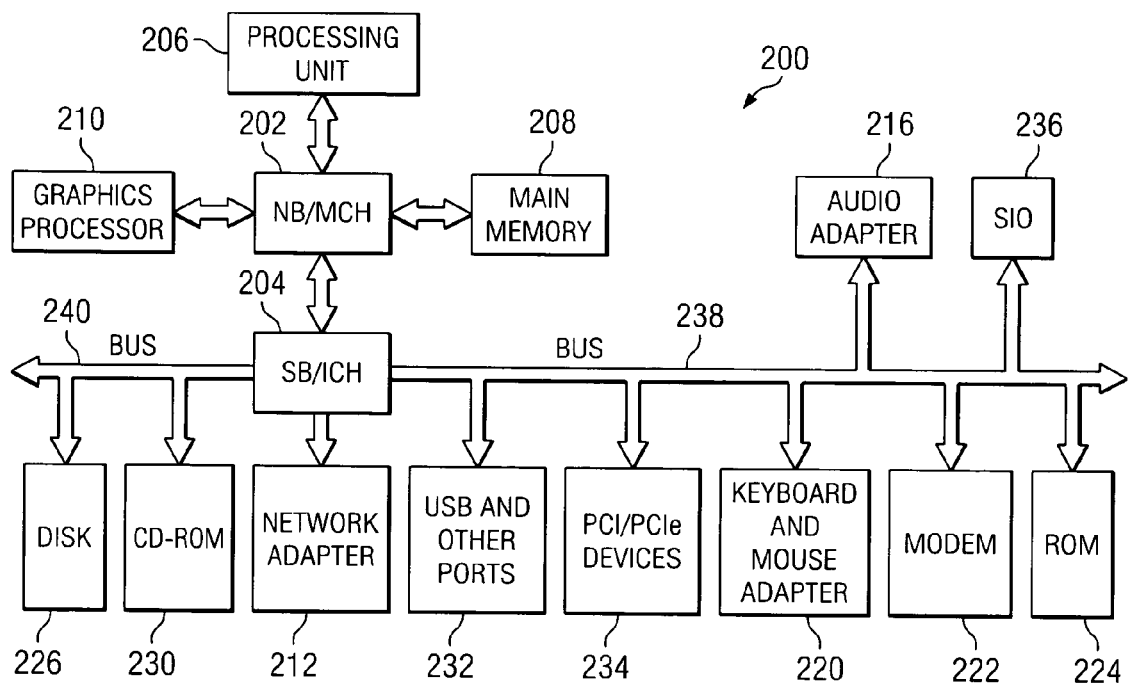
FIG. 2 is a block diagram of a data processing system in which aspects of the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers coupled together within network data processing system 100. Network 102 may include connections such as wire, wireless communication links, or fiber optic cables.

In the depicted example, server 104 and server 106 are coupled to network 102 along with storage unit 108. In addition, clients 110, 112, and 114 are coupled to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are coupled to NB/MCH 202. Graphics processor 210 may be coupled to NB/MCH 202 through an accelerated graphics port (AGP).

In the depicted example, local area network (LAN) adapter 212 is coupled to SB/ICH 204. Audio adapter 216, keyboard and mouse adapter 220, modem 222, read only memory (ROM) 224, universal serial bus (USB) ports and other communication ports 232, and PCI/PCIe devices 234 are coupled to SB/ICH 204 through bus 238, and hard disk drive (HDD) 226 and CD-ROM drive 230 are coupled to SB/ICH 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be coupled to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pseries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The present invention provides a computer implemented method, system and computer program product that enables effective generation of SIMD code in the presence of multi-threading and other false sharing conditions, and in machines having a segmented/virtual page memory protection system. As described previously, generating SIMD code without being aware of possible false sharing conditions or in machines having a segmented/virtual page memory protection system may result in code that incorrectly halts or that generates incorrect results. The SIMD code generating mechanism of the present invention may be implemented in a processor, such as processing unit 206 in data processing system 200 illustrated in FIG. 2.

False sharing (FS)—Consider first the following possible solutions to the problem of automatic SIMD code generation (simdizing) in the presence of multi-threading and other false sharing conditions (FS):

Ignore—This solution simply ignores the problem and relies on a user to manually disable (on a loop or program basis) simdizing when an error occurs. This approach has low overhead but may result in unstable code that generates incorrect results. The resulting code will be fast (so long as it is correct), but this approach is not robust. For example, a program may run satisfactorily using test inputs, but then crash after being implemented by a user and given real-world data as input.

Avoidance—This solution simply avoids simdizing loops for which FS issues may arise. For example, simdization may be simply disabled when multi-threading is turned on. Alternatively, simdization can be disabled when a simdized loop does not fully access all the data touched by the SIMD memory unit. This approach can significantly under-perform when important loops cannot be simdized.

Padding—This solution adds extra memory space between memory objects so that a false sharing situation will not arise. In addition to possibly increasing memory overhead, this approach is not a general approach because there are situations where padding cannot be shown to be legal. For example, padding for FS may require that extra memory locations be introduced within the data structures provided by the programmer, which is possible only if it can be shown that no pointer arithmetic relies on the original layout of the data. When the compiler cannot determine, for a given data structure, that pointer arithmetic is not explicit pointer arithmetic embedded in the original application and for that data structure, applying padding is not legal for that data structure as it may change the result of the application. However, if the compiler can determine that there is no explicit pointer arithmetic for a given data structure, this means that the compiler controls all accesses to that data structure, and thus the compiler is free to change the data layout for that data structure. Thus, with this approach, whenever padding is not appropriate, simdization would again need to be disabled.

The present invention provides a systematic, multiple level approach to the problem of simdization in the presence of multi-threading and other false sharing conditions that includes first analyzing the data accessed by a loop targeted by a simdizer, and then taking appropriate action based on the results of the analysis. In accordance with an exemplary embodiment of the present invention, the following action is taken based on the results of the analysis:

1. When memory accesses are FS-safe (i.e., when there is no false sharing), a statement is simdized normally.

2. When there are memory accesses that cannot be characterized as FS-safe, selective padding is applied, if appropriate, in order to make all memory accesses FS-safe.

3. When padding is not appropriate, e.g., impossible or too costly, loop splitting is applied so as to have a prologue sequential loop (PSL) and/or an epilogue sequential loop (ESL) to handle the boundary conditions for safe execution in the presence of FS. This enables the main loop (ML) to be safely simdized for maximum throughput without requiring special consideration of FS issues. Note that the PSL and the ESL can be fully unrolled when specific memory layout and loop trip count are known at compile time.

In accordance with exemplary embodiments of the present invention, only valid SIMD code is generated (unlike in the "ignore" approach), and simdization is not disabled for loops because of failure to detect safe memory accesses or to pad memory data structures. The method according to the invention is also quite aggressive in determining which memory accesses are safe, for example, by allowing some amount of additional memory accesses if it can be assured that doing so will not cause memory errors.

The present invention also provides multiple techniques for lowering overhead incurred while executing the sequential prologue or epilogue loops. Examples of overhead lowering techniques according to exemplary embodiments of the present invention include further loop splitting, statement switching, and statement re-execution.

In the following detailed description of an exemplary embodiment of the present invention, the use of 16 byte SIMD units is assumed for conciseness, although it should be understood that the present invention is not so limited and will also work for different values. Also, it is assumed that SIMD memory loads and stores access aligned memory only (i.e., the lower 4 address bits are truncated).

Figure 3:
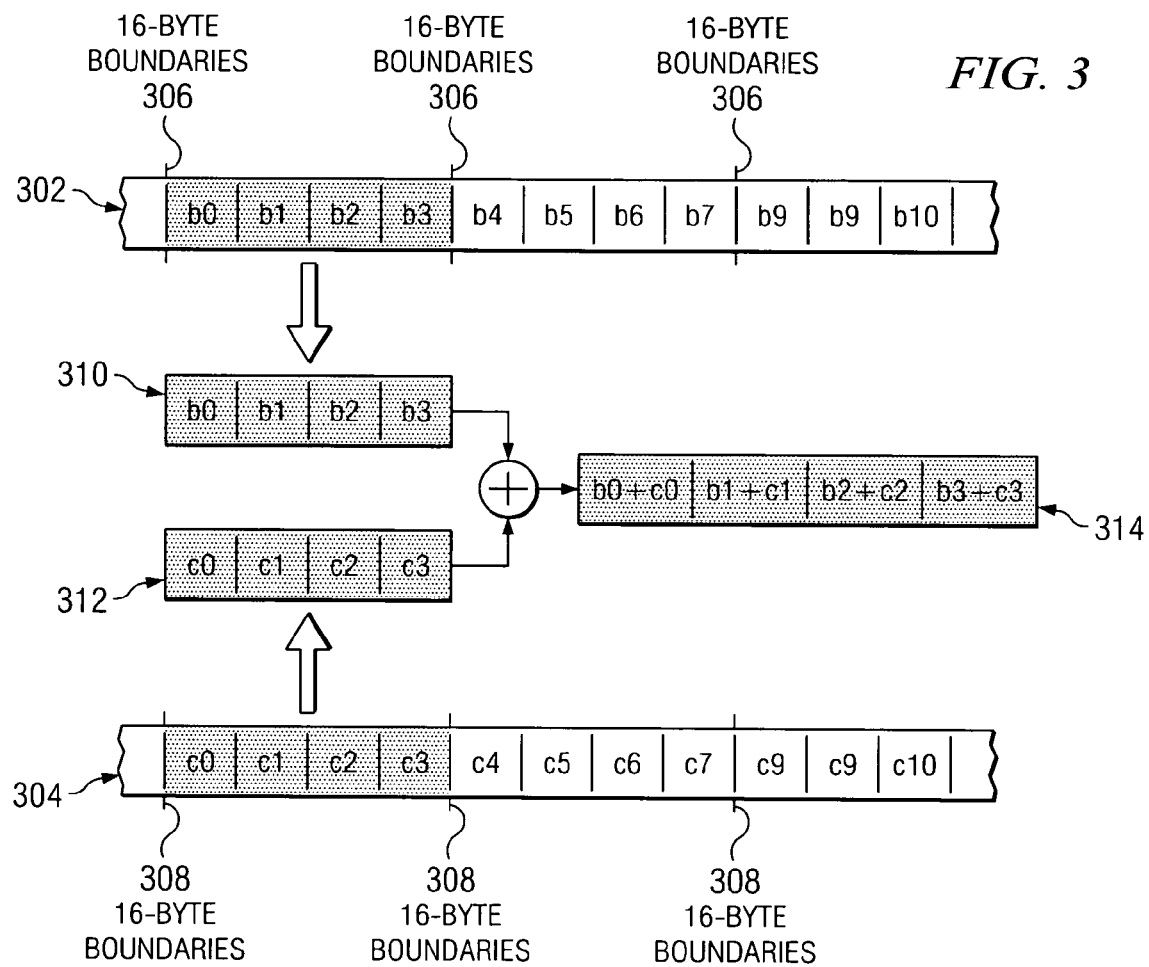
FIG. 3 is a block diagram that schematically illustrates an exemplary SIMD computation to assist in providing a clear understanding of the simdization process.

As indicated previously, SIMD is basically a set of operations that enable efficient handling of large quantities of data in parallel, and the automatic generation of SIMD code is referred to as simdization. FIG. 3 is a block diagram that schematically illustrates an exemplary SIMD computation to assist in providing a clear understanding of the simdization process. In particular, FIG. 3 illustrates simultaneous processing of multiple "b[i]+c[i]" data, where the memory location storing b[i] is schematically represented as 302 and the memory location storing c[i] is schematically represented as 304. As shown, the memory locations are divided into 16 byte SIMD units separated by boundaries 306 and 308, respectively. As also shown in FIG. 3, the results of loading the data from memory using the SIMD load operations with respect to aligned 16 byte SIMD units results in the data b0, b1, b2, and b3 in register 310 and c0, c1, c2, and c3 in register 312. As shown in FIG. 3, the data in 310 and 312 is then added together using a single SIMD add operation and results in b0+c0, b1+c1, b2+ c2 and b3+ c3 as shown at 314.

In a non-simdized environment, for each iteration of a loop, the "b[i]+c[i]" data would have to be added individually. That is, the result of the first non-simdized operation would yield b0+c0, the result of the second would yield b1+c1, and so on. In contradistinction, as shown at 314, the result of one operation in the SIMD environment yields b0+c0, b1+c1, b2+ c2 and b3+ c3.

1. Safe Memory Location Analysis

A memory access is considered to be FS-safe if it does not expose the normal simdization process to any additional errors due to multi-threading/multi-processing beyond the errors found in a sequential, nonsimdized version of the code. Since false sharing is only concerned with memory locations being falsely overwritten, the focus here is on store operations. When needed, a store memory access is further defined as being "prologue FS-safe" (P-FS-safe) or "epilogue FS-safe" (E-FS-safe) where, respectively, that memory access does not expose the normal simdization process during the prologue or the epilogue of the loop. The term "FS-safe" implies being both P-FS-safe and E-FS-safe.

When addressing a multi-threading (FS) issue, no false sharing can be tolerated if the access by the simdized code to the data is not synchronized. As a result, simdization for a statement is P-FS-safe only if it can be guaranteed that the first memory location written into by its store resides in a 16 byte chunk of memory that is not also accessed by another thread. Similarly, a statement is E-FS-safe when it can be guaranteed that the last memory location written into by its store resides in a 16 byte chunk of memory that is not also accessed by another thread.

It should be noted that it is sufficient to focus on only the first and last store of each statement in a loop because false sharing is a boundary condition. In particular, if false sharing does not occur for the first and last store, then there will also be no false sharing for any of the intervening stores. This holds because the simdization algorithm utilized processes only contiguous sections of memory (by each reference in the loop). The present invention, though, may be applied to simdization algorithms that simdize non-continuous sections of memory by treating individually, each of the contiguous subsections (present in the overall section processed by a given thread/processor).

Statements that are in a sequential part of the code are, by definition, safe with respect to the MT issue. This is the case because false sharing of a contiguous area of data can only occur at the boundaries of that data segment. This is not the case, however, when addressing the compiler scheduling (CS) issue, as the CS occurs due to scheduling issues within a single contiguous area of data.

2. Padding

When memory accesses cannot be determined as FS-safe, then padding should be applied if appropriate. Padding must be aggressive as extra memory often needs to be added within arrays that are parallelized. While this is sometimes possible, careful analysis must be performed to guarantee that changing the memory layout of the targeted data structures is legal, and will result in properly working code. Specifically, as discussed above, changing the memory layout of a targeted data structure is legal if the compiler can determine that there is no explicit pointer arithmetic for the given data structure, as this means that the data is only accessed through compiler controlled data access. As a result, the compiler can violate the typical convention between programmer and programming language by padding the data without adverse effect on the semantics of the program.

3. Loop Splitting

When there are remaining unsafe store memory accesses and padding is not appropriate, at the very least, statements that include them will need to be executed in a non-SIMD fashion until a safe, steady state is reached. Similarly, the simdized loop will need to be exited early so that the last few iterations can be executed in a safe, non-SIMD fashion.

Consider the following example:

```
int a[8];// aligned at 4 mod 16 bytes
int b[8];// aligned at 8 mod 16 bytes
for(int i=0; i<9; i++) {
    a[i]= ...
    b[i]= ...
}
```

By looking at the memory locations touched by this loop, the illustration below can be drawn:

| prologue | | | | steady state | | | | epilogue | | | |
|---|---|---|---|---|---|---|---|---|---|---|---|
| . | a | a | a | \|a | a | a | a | \|a | a | . | . |
| . | 0 | 1 | 2 | \|3 | 4 | 5 | 6 | \|7 | 8 | . | . |
| . | . | b | b | \|b | b | b | b | \|b | b | b | . |
| . | . | 0 | 1 | \|2 | 3 | 4 | 5 | \|6 | 7 | 8 | . |

First, each entry in the above illustration corresponds to an integer in memory, and all non-empty entries correspond to a memory location written by the loop. Each group of four consecutive entries corresponds to the data touched by a 16 byte SIMD load or store operation. Three separate areas can thus be distinguished: the prologue where some of the memory locations on the left are untouched (i.e. the first 4 leftmost columns in the illustration above, some of which are untouched), the steady state where all memory locations are written (i.e. the middle 4 columns in the illustration above), and the epilogue where some of the memory locations on the right are untouched (i.e. the last 4 rightmost columns in the illustration above, some of which are untouched).

In this example, it is assumed for conciseness that the memory references are neither P-FS-safe nor E-FS-safe, so that it may be shown how the prologue sequential loop (PSL) and the epilogue sequential loop (ESL) work. However, it should be understood that if all references are P-FS-safe, then there is no need for a PSL; similarly, if all references are E-FS-safe, there is no need for an ESL.

Since it is assumed that memory references "a" and "b" are neither P-FS-safe nor E-FS-safe, it must be ensured that none of the untouched memory locations shown above are overwritten. Indeed, in a multi-threading mode, an untouched memory location must not even be overwritten by its original value, as this may cause a race condition between this thread (overwriting an untouched memory with its original value) and another thread (overwriting that same memory location with its expected new value). An example of a race condition is as follows. Suppose there is false sharing on a quad-byte X by thread A and thread B, with A owning X0 and X1 and B owning X2 and X3, where (X0, X1, X2, X3) are distinct integers within the quad byte X. Suppose also, both A and B read X, then each individually mix their new values into X. Assume the original values of X as (X0, X1, X2, X3) and the new values of X, as modified by thread A and B are, respectively, A0 and A1 and B2 and B3. Then, the values of X in A after inserting the values of X it owns, A has (A0, A1, X2, X3); similarly B has (X0, X1, B2, B3). Now one of thread A or B will write this data first, and the other will write it second. Depending on which one is first or second, the final values will either be (A0, A1, X2, X3) or (X0, X1, B2, B3) but not the expected (A0, A1, B2, B3). This occurs because of the race condition where A and B did not wait for the other's write to complete before being allowed to read the value of X. Such situations must be avoided.

Returning to the above discussion, the loop is thus split to have 3 copies, the PSL, the main simdized loop (ML) and the ESL.

It should be noted that the number of iterations in the prologue loop is related to the alignment of the store. Because the alignment of array "a" is 4 byte, (16−4)=12 more bytes of data must be generated in the PSL. For array "b", however, the alignment is 8 and thus only (16-8) bytes of data are needed. A similar conclusion holds for the number of bytes needed in the epilogue. It is assumed here as follows: $A(x)$ is the alignment of the array x, $S(X)$ is the size of the elements of the array x, $N(x)$ is the virtual vector byte length [4] (i.e., the blocking factor of the simdized loop multiplied by the element size $S(x)$) width), and UB is the upper bound of the normalized loop. The number of bytes needed in the prologue is defined as:

$$PrologueByte(x) = N(x) - A(x)$$

This definition of PrologueByte ensures that one or more bytes will be covered by the prologue.

Similarly, the number of bytes needed in the epilogue is:

$$EpilogueByte(x) = (A(x) + UB * S(x)) \bmod N(x)$$

In the above example, with $A(a)=4$, $A(b)=8$, $S(a)=S(b)=4$, $N(a)=N(b)=16$, $UB=9$, we get for arrays a and b, respectively, a PrologueByte of 12 and 8, as well as an EpilogueByte of 8 and 12. Note that when alignment is only known at runtime, the PrologueByte and the EpilogueByte quantities can only be determined at runtime (although a bound could be estimated at compile-time).

The terms PrologueElem(x) and EpilogueElem(x) are now introduced as their respective byte quantities divided by the element byte size of x. In particular:

$$PrologueElem(x) = PrologueByte(x)/S(x)$$

$$EpilogueElem(x) = EpilogueByte(x)/S(x)$$

This allows byte quantities to be converted to number of element quantities. For conciseness, it is assumed that the element is naturally aligned, e.g., an integer value (4 bytes) is expected to be located in memory at a multiple of 4 bytes. The present invention, however, may be applied in instances involving non-naturally aligned data.

In order to provide a clear understanding of the present invention, some code generation schemes that are permitted by the framework according to the present invention are described below.

3.1 Distributed Loop Scheme

This scheme distributes each statement in the PSL and ESL to distinct loops. In the above example, we thus have the following:

```
for(i=0; i<PrologueElem(a); i++) a[i]= ... ;
for(i=0; i<PrologueElem(b); i++) b[i]= ... ;
//simdized ML
for(i=UB-EpilogueElem(a); i<UB; i++) a[i]= ... ;
for(i=UB-EpilogueElem(b); i<UB; i++) b[i]= ... ;
```

The simdized ML loop is the same as would have been generated with the "all reference FS-safe" code generation scheme, simply starting with its lower bound equal to the blocking factor of the ML, as the first couple of iterations have already been handled in the PSL. Similarly, the ML loop stops earlier, with its upper bounds reduced by the blocking factor of the ML, since the last couple of iterations are handled by the ESL.

Note that distributing each statement that way is always legal because otherwise, the code could not be simdized to begin with. To be precise, the order of the statements after distribution might have to change due to data dependences. Some issues may arise in presence of private variables in the loop; in such case, scalar expansion needs to be performed. Namely, any such private variable needs to be expanded into a small array. Note also that if the alignment is known at compile time, the PSL and ESL can be fully unrolled. If two statements are known to have the same alignment, it is possible to fuse back loops (provided that no dependencies to/from other statements prevent it).

An advantage of this approach is that each statement is executed precisely the number of times needed, which is particularly advantageous if alignment is known at compile time. For runtime alignment, however, the number of extra loops (two per statement) may be too large for statements that involve a small amount of computations. As a result, this scheme may not result in the fastest execution time in all conditions, especially in presence of runtime alignment.

3.2 Switched Loop Scheme

To reduce the number of additional loops to two, one can use conditional statements within the PSL and ESL. In the example, we would thus have the following:

```
mp=Max(PrologueElem(a), PrologueElem(b));
for(i=0; i<mp; i++) {
    if(i<PrologueElem(a)) a[i]= ... ;
    if(i<PrologueElem(b)) b[i]= ... ;
}
// simdized loop
me=Max(EpilogueElem(a), EpilogueElem(b));
for(i=UB-me; i<UB; i++) {
    if(i>=UB-EpilogueElem(a)) a[i]= ... ;
    if(i>=UB-EpilogueElem(b)) b[i]= ... ;
}
```

While this scheme effectively reduces the number of additional loop structures, the branching is not reduced significantly because of the conditional statements within the loop. However, if-conversion and predicted execution may be used to remove jumps if advantageous. Similarly, unswitching techniques can be used to streamline the execution of the PSL and ESL.

3.3 Simdized Distributed or Switched Loop Scheme

This scheme is a variation on the two previous schemes where the computation corresponds to the same computation of one iteration of the simdized ML (like the computations in the ML) but with no stores (i.e., all the final values kept in SIMD registers), or a store to a temporary memory location. Then, loops similar to those above are used, simply to store individually one value from the SIMD registers into memory. The example would be as follows in the simdized distributed loop scheme:

```
vecA= ... ;//SIMD computation of a[PrologueElem(a)-
   B ... PrologueElem(a)]
vecB= ... ;//SIMD computation of a[PrologueElem(b)-
   B ... PrologueElem(b)]
for(i=0;i<PrologueElem(a);i++) a[i]="extracted value
   of a[i] out of vecA";
for(i=0;i<PrologueElem(b);i++) b[i]="extracted value
   of b[i] out of vecB";
// simdized ML
vecA= ... ;//SIMD computation of a[UB-EpilogueElem(a)-
   B ... UB-EpilogueElem(a)]
vecB= ... ;//SIMD computation of b[UB-EpilogueElem(b)-
   B ... UB-EpilogueElem(b)]
for(i=UB-EpilogueElem(a);i<UB;i++) a[i]="extracted
   value of a[i] out of vecA";
for(i-UB-EpilogueElem(b);i<UB;i++) b[i]="extracted
   value of b[i] out of vecB";
```

In the above example, the statement "vecA= . . . ;//SIMD computation of a[PrologueElem(a)–B . . . . PrologueElem (a)]" corresponds to a SIMD statement that computes all the values, inclusively, from the PrologueElem(a)–B value to the PrologueElem(a) value. Similar simdized statements are also found in the epilogue, when applicable. The advantage of this scheme as compared to their non-simdized respective schemes is that the computations are fully simdized. This scheme is most efficient if the architecture supports efficient scalar stores from vector registers.

3.4 Redundant Execution Scheme

This scheme uses the fact that some statements can be re-executed multiple times, for example, statements that do not involve a recurrence and are not part of an anti-dependence within the loop. For example, if the above statements are:

```
a[i]=c[i]+d[i];
b[i]=2*e[i];
``` such statements can be safely re-executed. Thus, the conditional statements can be removed in the above scheme:

```
mp=Max(PrologueElem(a), PrologueElem(b));
for(i=0; i<mp;i++) {
    a[i]=c[i]+d[i];
    b[i]=2*e[i];
}
```

-continued

```
// simdized loop
me=Max(EpilogueElem(a), EpilogueElem(b));
for(i=UB-me; i<UB;i++) {
    a[i]=c[i]+d[i];
    b[i]=2*e[i];
}
```

In this scheme, consider the underlined entry b2 below, for example. This entry is computed twice because of prologue, once within the PSL loop, and once within the first iteration of the ML. A similar situation occurs with the underlined entry a6 because of epilogue, where it is first computed within the last iteration of the ML and once more within the ESL loop.

| prologue | | | steady state | | | epilogue | | |
|---|---|---|---|---|---|---|---|---|
| $a_0$ | $a_1$ | $a_2$ | $a_3$ | $a_4$ | $a_5$ | $\underline{a_6}$ | $a_7$ | $a_8$ |
| | $b_0$ | $b_1$ | $\underline{b_2}$ | $b_3$ | $b_4$ | $b_5$ | $b_6$ | $b_7$ | $b_8$ |

An advantage of this scheme is reduced switching activity at the cost of some redundant computation, a tradeoff that may be particularly advantageous for small computations.

It should be understood that the above algorithms are by no means exclusive. It is, for example, possible to combine the schemes such as by having computationally expensive statements distributed into separate loops (dependence permitting) while allowing small statements to re-execute (dependence and/or reduction permitting).

As indicated above, another feature of modern processors that has an effect on SIMD code generation is support for a segmented/virtual page memory protection system (MPS). MPS will cause a problem if the generated SIMD code accesses memory locations that are beyond the range of locations touched by the original, non-simdized code. As pointed out above, this is not a program correctness issue because the additional memory location's values touched by the simdized code are not used to modify permanent program state. The sole issue with respect to this aspect is that such memory locations should not be addressed at all as they may be outside of their memory segments. The problem with touching data outside of their memory segments is that, in many systems, this would result in a memory violation interrupt that will abort the program, as programs are typically not expected to touch data beyond their memory segments. Depending on the address, accessing data beyond its data segment (or in another program's segment) may also result in unwanted side effects. This is why, in such a system, transformations that may touch memory past a program's segment limits should not be allowed.

Memory Protection System (MPS)—A similar process as described above with respect to false sharing issues is performed with respect to the presence of MPS. In particular, the data accessed by a loop targeted by a simdizer is first analyzed, and then appropriate action is taken based on the results of the analysis. In accordance with an exemplary embodiment of the present invention, the following action is taken based on the results of the analysis:

1. When memory accesses are MPS-safe (i.e. no out of bound memory accesses), the statement is simdized normally.

2. When there are accesses that cannot be characterized as MPS-safe, selective padding is applied, if appropriate (possible/beneficial), in order to make all memory access safe.

3. When padding is not appropriate, memory access guarding is applied to prologue statements (PS) and epilogue statements (ES) that handle the boundary conditions for safe execution in the presence of the MPS issue. The main loop (ML) can then be safely simdized for maximum throughput without special consideration for MPS issues. Note that the PS and ES are simdized statements. However, they can also be computed in a sequential, scalar fashion if need be.

Again, with the present invention, only valid SIMD code is generated (unlike the "ignore" approach) and simdization is not disabled for loops because of failure when detecting safe memory accesses or failure to pad memory data structures. The method is also aggressive in determining which memory accesses are MPS-safe, e.g. allowing some amount of additional memory accesses if one can guarantee that they will not cause memory errors.

A code generating scheme according to exemplary embodiments of the present invention will generally result in no out-of-bounds memory accesses. Thus, a much larger fraction of the memory accesses may be MPS-safe, and therefore require no further padding (and associated memory pollution) and/or runtime guarding (and associated runtime overhead).

The following description addresses the MPS issue for memory SIMD units that do not support arbitrary runtime realignment in hardware. Assuming a 16 byte SIMD unit, a SIMD load of b[i] at address X will ignore the 4 lowest order bits from the address and return 16 bytes of data from that truncated address. In other word, it returns a chunk of data that includes the desired b[i] data, but does not necessarily start with that value. More precisely, it first truncates the address X to X & ~0xF, or X−X mod 16, and then returns the next 16 consecutive bytes from there.

1. MPS-Safe Memory Location Analysis

A memory access is defined as being MPS-safe if it does not expose the normal simdization process to any memory protection errors beyond the errors that would be caused by a sequential, nonsimdized version of the code. When needed, a memory access is further defined as being prologue safe (P-MPS-safe) or epilogue safe (E-MPS-safe), where, respectively, that memory access does not expose the normal simdization process during the prologue or the epilogue of the loop to any memory protection errors beyond the errors that would be caused by a sequential, nonsimdized version of the code. By definition, a reference is MPS-safe if it is both P-MPS-safe and E-MPS-safe.

1.1 All Relatively Aligned Case (all Aligned within Statement, No Double Epilogue)

A memory protection system (MPS) is basically a mechanism that prevents one process from corrupting the memory of another process running in a data processing system at the same time. An MPS usually employs both hardware and software to allocate distinct memory to different processes, and to handle exceptions when a process tries to access memory outside its bounds. One memory protection system is "Segmentation" in which a process is restricted to using only certain parts of memory, referred to as segments, which are defined by hardware registers which give the limits of allowed memory addresses. If an address that is about to be read or written to is outside the permitted address space of the process, a general protection fault will occur. Another MPS is "Paging" in which memory address space is divided into pieces called pages. Using a virtual memory mechanism, each page can be made to reside in any location of physical memory, or be flagged as being protected. If a process is accessing a virtual memory location that is not mapped by a table page, a page fault will occur. Since the granularity of the memory protection system will be larger (e.g. 4 K bytes) than the width of the SIMD units (16 bytes), the simdized loop can access additional memory locations over the original loop as long as no 4K page boundary is crossed. This is very helpful, for example, in cases as below:

```
int a[128]; // alignment unknown
for(i=0; i<128; i++) a[i] = a[i]+1;
```

In this example, the single statement can be safely simdized for the following reasons. Assume that the address of a[0] is X and its alignment is X mod 16. When executing a SIMD load of a[0], the returned data corresponds to the 16 bytes starting from the truncated address X & ~0xF or X−(X mod 16). But truncating to the lower 16 byte boundaries cannot make the load fetch data below a 4K page boundary, because the page boundary is itself a multiple of 16. The same holds at the other end, in the epilogue, say the address of a[127]=Y. When executing a SIMD load of a[127], the returned data (16 bytes from Y−(Y mod 16) cannot cross a 4K boundary.

In fact, as long as the memory protection boundaries are aligned at SIMD memory unit byte width, accesses such as the one in this statement are safe. This holds only when there is no data reorganization, i.e. when it is known that all the data streams are relatively aligned with each other. Such cases are quite frequent, such as in the example below:

```
int a[128], b[128], c[128], d[128]; // all
arrays are aligned with each other
for(i=LB;i<UB;i++) a[i] = b[i] +c[i]+ d[i];
``` where the lower and upper bound LB and UB, respectively, can be runtime variables. In such a case, the actual alignment of the first and last variable may not be known at compile time, e.g. a[LB] and a[UB-1] for array a, but since all variables are relatively aligned, all accesses are safe. To be more precise, there are certain conditions where a double epilogue is required. In such case, the references cannot be guaranteed to be E-MPS-safe using this technique alone.

1.2. Compile Time Misaligned Cases

While the situation is more complicated in the presence of misalignment and data size conversion, the case where all the alignment and loop bounds are known at compile time is still straightforward if a modification is made to the SIMD code generation algorithm that produces the SIMD code for the prologue and epilogue.

Figure 4A:
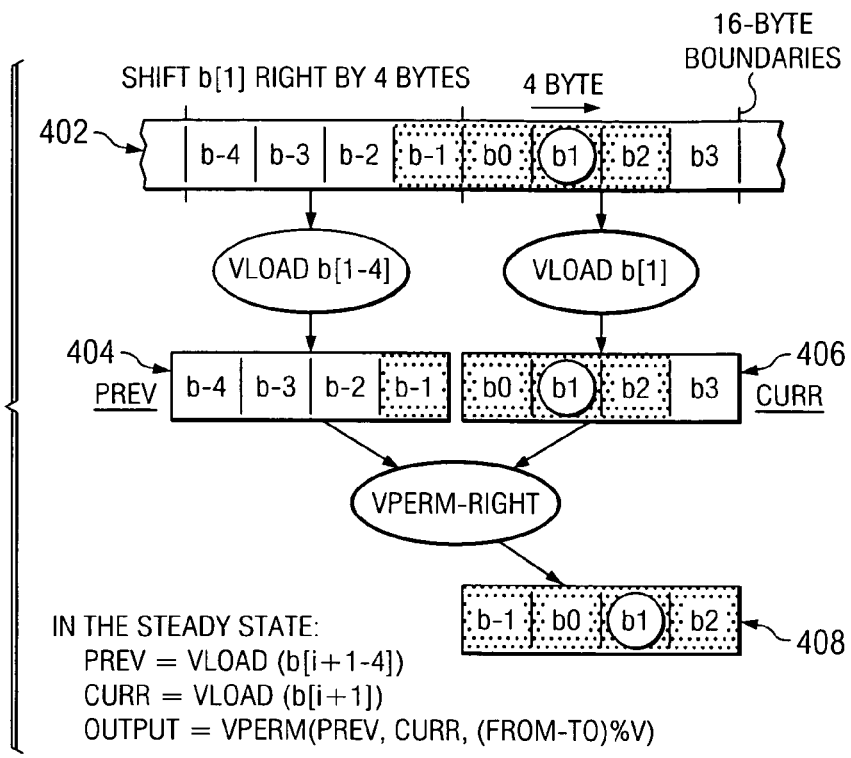
FIGS. 4A and 4B are diagrams that schematically illustrate shifting of data right or left, respectively, according to an exemplary embodiment of the present invention.
Figure 4B:
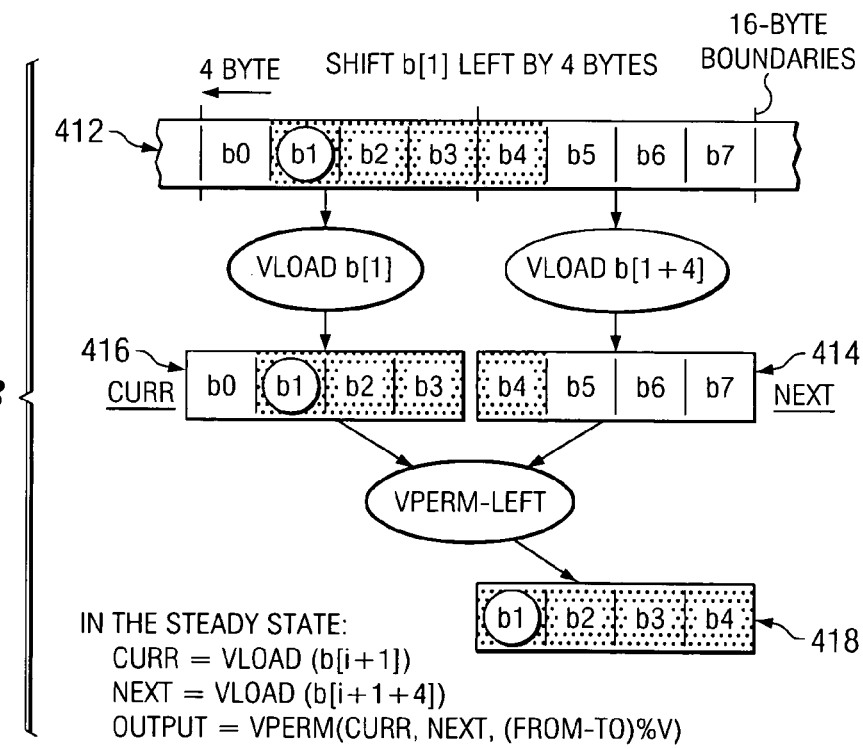

In such a case, the standard SIMD code generation scheme is used, for example as below, where the reference b[i+1] needs to be shifted right by 4 bytes as shown in FIG. 4A or left by 4 bytes as shown in FIG. 4B. In either case, shifting requires loading of 2 vectors.

In particular, FIGS. 4A and 4B are diagrams that schematically illustrate shifting of data right or left, respectively, according to an exemplary embodiment of the present invention. In FIG. 4A, the previous and current SIMD vectors are accessed to compute the desired shifted-by-4-byte "b" vector. The memory location storing b[i] is schematically represented as 402. Through two VLOAD operations VLOAD b[1−4] and VLOAD b[1], two vectors are loaded from the data in memory store 402. These vectors are prev 404 and curr 406. This "previous" SIMD vector access may not be P-MPS-safe as it reads a full SIMD vector, namely prev 404, that does not contain any of the data normally accessed by the loop. However, since the alignment and loop bounds are known at compile time, it can be statically determined which load is required and which one contains data that will be discarded (e.g. VLOAD b[1−4] in FIG. 4A). Specifically, the data elements b[−4], b[−3] and b[−2] will not be used. Thus, a VPERM-RIGHT operation is performed on vectors prev 404 and curr 406 to properly align the data, thereby shifting the vector four bytes to the right, resulting in vector 408 which only contains data that will be used.

A similar situation is shown in FIG. 4B, where the "next" SIMD vector results in an access that is not E-MPS-safe as it may read a full vector past the last data normally accessed by the loop. The memory location storing b[i] is schematically represented as 412. Through two VLOAD operations VLOAD b[1] and VLOAD b[1+4], two vectors are loaded from the data in memory store 412. These vectors are next 414 and curr 416. However, similar to the case in FIG. 4A, since the alignment and loop bounds are known at compile time, one can eliminate the memory accesses that contain data that will be discarded at compile time. Thus, a VPERM-LEFT operation is performed on vectors curr 416 and next 414 to properly align the data, shifting the vector four bytes to the left, resulting in vector 418, which contains only data that will be used.

In general, by using compile time alignment information as well as compile time loop bound information, the SIMD code generation algorithm can be changed so as to only generate memory references that include at least one memory reference that would have been accessed by the original loop. Using the assumption that the memory protection boundary is aligned to the SIMD unit width (e.g. 4K is aligned with respect to 16 byte units), all references generated by this algorithm are safe.

1.3. Runtime Alignment Cases without Data Size Conversion

There is another case where a modification to the SIMD code generation of the code in the prologue and epilogue will result in all references being safe. This case includes all compile time and runtime alignments with compile time and runtime loop bound. It does not, however, include loops that contain data of different sizes, loops that requires a double epilogue, and, for simplicity, statements that have unrelated stream-shifts of stream-shifts (i.e. 2 distinct stream-shifts between leaf and root nodes), since the prepending generated by each shift stream may introduce out of bound memory accesses that cannot be caught with the method. In other words, the method described below may not cover the above listed case, and because of that, loops that exhibit one or more of the above characteristics are not considered for this particular scheme. When the shifts of shifts are related (i.e. not arbitrary, but, for example, where the first shift shifts left to zero and the next shift shifts right from zero), the technique described below would apply.

Figure 5A:
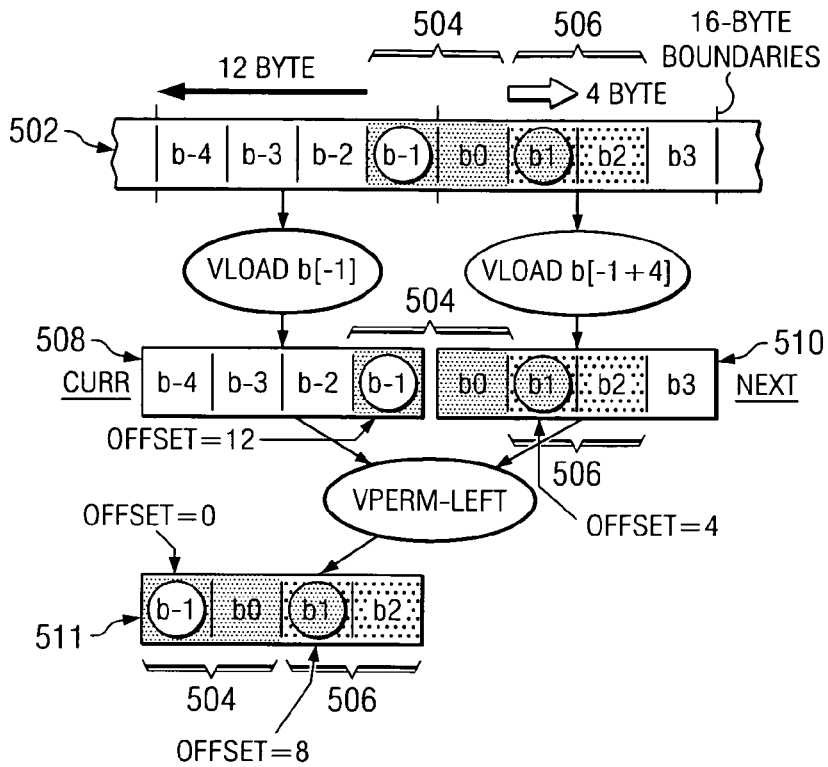
FIGS. 5A and 5B are diagrams that schematically illustrate stream shifting for code generation schemes that support optimized shift-stream placement according to an exemplary embodiment of the present invention.
Figure 5B:
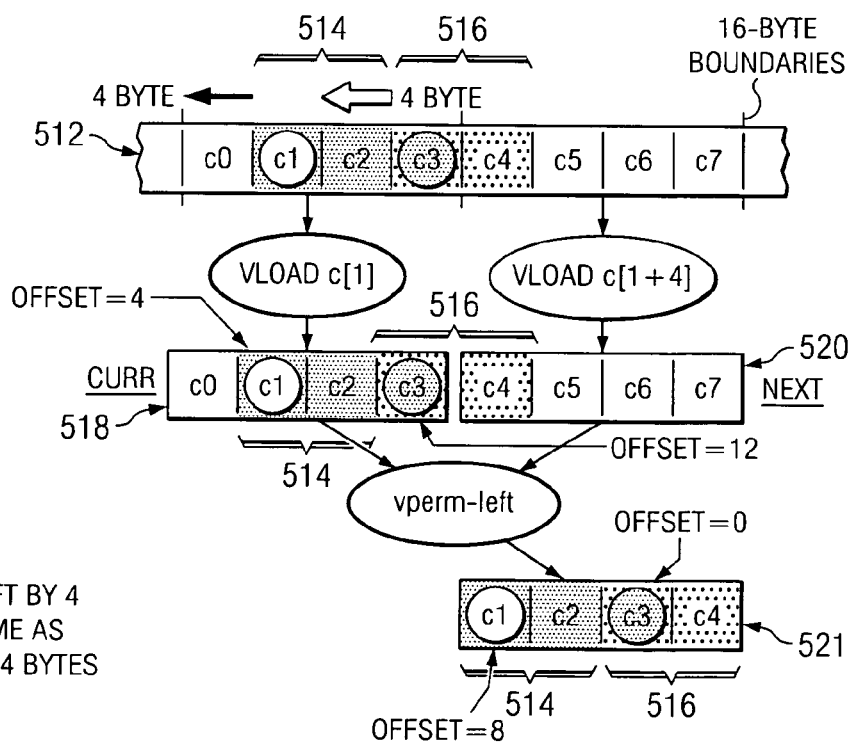

FIGS. 5A and 5B are diagrams that schematically illustrate stream shifting for code generation schemes that support optimized shift-stream placement according to an exemplary embodiment of the present invention. In particular, FIGS. 5A and 5B illustrate how stream shifting is done for code generation schemes that support optimized shift-stream placement even in the presence of runtime alignment. While the illustrated code generation scheme is made to work for runtime alignment by making sure that all shift-left and shift-right are normalized to shift-left only, the same additional accesses are performed. FIG. 5A corresponds to a situation where b[i+1] is shifted right by 4 bytes. The memory location storing b[i+1] is schematically represented as 502. The shifting is done by prepending 8 bytes to the stream, the grey boxes 504 in FIG. 5A. The prepended bytes do not include useful data; prepending is performed to allow the same shift code sequence to shift data either left or right depending on the runtime alignment. The motivation for the prepending technique is as follows. Since for runtime alignment, it is undesirable to decide at runtime one of two distinct code sequences to shift data either left or right, depending on the actual value of the alignment involved in the computation, one would instead modify the address of the data that is to be shifted. This process is referred to here as "prepending" the address stream, since the effect is that of adding or prepending data to the stream that is to be shifted. That amount is only known at run time, as the amount by which a stream is to be prepended is correlated with the alignment of the involved streams. The prepended address content is shown as grey boxes 504 in FIG. 5A. The desired stream on which operations would be performed commences with data elements b[1] and b[2], denoted in FIG. 5A as 506. Note that the data that is included in the prepending, that is, data elements 504, are not actually used, so the correctness of the program (in absence of memory protection system, multi-threading issues and other related issues) is not compromised. In this case, in FIG. 5A, there is an extra vector load in the left (reference is thus not automatically P-MPS-safe). Through two VLOAD operations VLOAD b[−1] and VLOAD b[−1+4], the data stored in the memory illustrated as 502 is loaded into two vectors, curr 508 and next 510. Thus, a VPERM-LEFT operation is performed on curr 508 and next 510 to properly align the data, shifting the vector twelve bytes (i.e. three data elements) to the left, which is equivalent to shifting the same vector four bytes (i.e. one data element) to the right. The result is vector 511.

FIG. 5B illustrates the case where c[i+3] is now shifted by 4 bytes to the left. In this case, there is an extra vector load on the right (the reference is thus not automatically E-MPS-safe). As noted in the preceding paragraph, the prepended amount, indicated by boxes 514 in FIG. 5B, is added to the memory stream in order to use a "shift to the left" code sequence regardless of the runtime alignment involved in the computation. In this specific case, this resulted in prepending two data elements to the memory stream, namely c[−1] and c[0]. In FIG. 5B, data elements targeted by the operation are c[3] and c[4], represented as dotted boxes 516. The concern now is with the safety of the prepended references 514. Through two VLOAD operations VLOAD c[1] and VLOAD c[1+4], the data in the memory illustrated as 512 is loaded into two vectors, curr 518 and next 520. Thus, a VPERM-LEFT operation is performed on curr 518 and next 520 to properly align the data, shifting the vector four bytes (one data element) to the left, resulting in vector 521.

The above algorithm is formalized as follows to better describe the present invention. For simplification, the shift is assumed to be just below the load; however, the algorithm works for arbitrarily placed stream-shifts as well. Below, the variables "f" and "s" represent temporary SIMD registers used to hold data that need to be kept around for a short amount of time. Such temporary registers are typically allocated out of the normal pool of SIMD registers, though the scheme is not limited to such typical case.

Step 1) Compute (possibly at runtime) the prepend amount, say S, for processing reference b[i].

Step 2) f=SIMD load &b[i]−S.

Step 3) s=SIMD load &b[i]−S+N, where N is the byte width of the SIMD unit.

Step 4) Compute (possibly at runtime) the alignment of &b[i]−S, say A, (i.e. address mod 16).

Step 5) Concatenate f and s, skip first A bytes, keep next N bytes. This is the result, where the data has been properly shifted as is illustrated in FIGS. 5A and 5B.

Using the above algorithm (referred to as the "standard algorithm", it can be shown that the reference b[i] is not P-MPS-safe because of the access generated in Step 2. Indeed, a SIMD load of &b[i]−S may load N bytes of data, all before the first b[i] value. Similarly, it can be shown that the reference b[i]] is not E-MPS-safe because of the access generated in Step 3. Again, a SIMD load of &b[i]−S+N (with S<N by definition when there are no conversions) may load N bytes of data, all after the last b[i] value.

Focusing now on the prologue, it should be noted that the loaded data in Step 2 is used if and only if it contains the first element accessed by the loop. Consider the example in FIGS. 5A and 5B. The situation in FIG. 5A is reached when the alignment of the first reference (b[i+1] here, with an alignment of 4 bytes) minus the prepend amount (8 bytes here) is smaller than zero. As a result, the loaded value by Step 2 contains no useful data. No useful data refers to the fact that no data before the first may be legally used in deriving any permanent results. It is indirectly needed in that a regular pattern of computation is needed regardless of the case, i.e. an effective left-shift or right shift. But since the actual data is not used in relevant ways, any particular values in that "f" register are not relevant to computation. If, on the other hand, Step 2 loads useful data, it is because the alignment of the first reference minus the prepend amount is nonnegative, as in FIG. 5B. In FIG. 5B, the alignment of the first element accessed by the loop, c[3], has an alignment of 12 bytes, and the prepend amount is 8 bytes. As a result, 12-8 is nonnegative, and the load in Step 2 loads data that will be used; c[3] in this case. Then it loads precisely the same value as a SIMD load of the first reference.

Thus, the standard algorithm above can be revised as follows (changes underlined).

Step 1) Compute (possibly at runtime) prepend amount, say S, as in [1], for processing reference b[i].

Step 2) f=SIMD load &b[i].

Step 3) s=SIMD load &b[i]−S+N, where N is the byte width of the SIMD unit.

Step 4) Compute (possibly at runtime) the alignment of &b[i]−S, say A.

Step 5) Concatenate f and s, skip first A bytes, keep next N bytes. This is the result, where the data has been properly shifted.

Figure 6A:
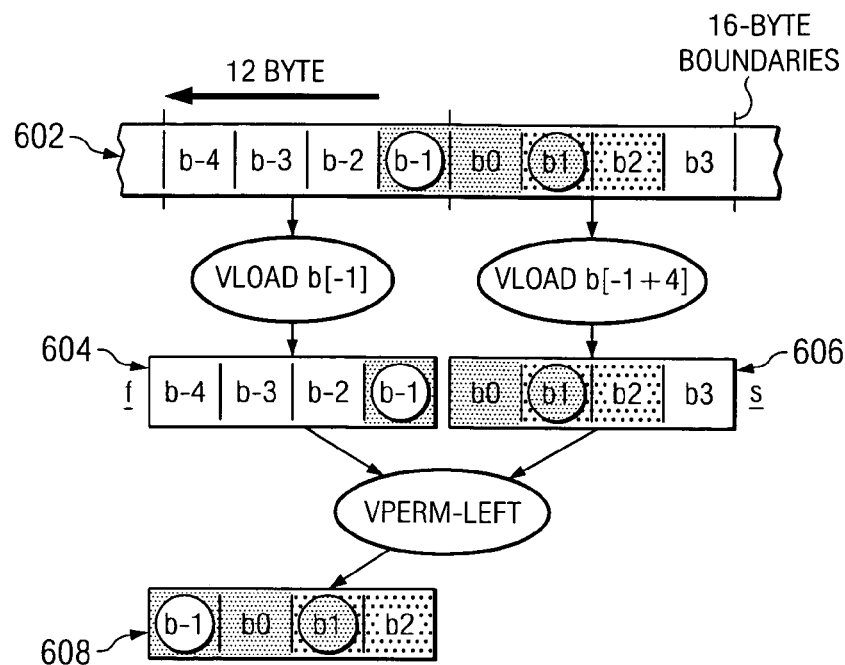
FIGS. 6A-6D are block diagrams that schematically illustrate standard and modified algorithms according to exemplary embodiments of the present invention.
Figure 6B:
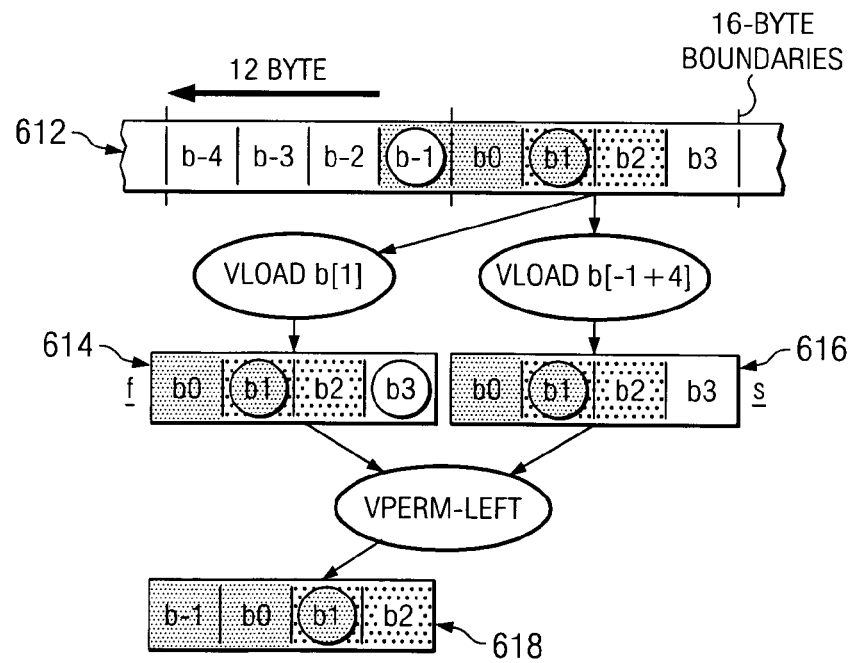

Note that in Step 2 of the "modified standard algorithm" above, &b[i] is loaded instead of the &b[i]−S. This is because when &b[i]−S results in different values, it is not used, meaning the different values will not be used by the computations that will impact the stored values; otherwise when it is used, it uses the same value as would have been obtained using &b[i] instead of &b[i]−S. FIGS. 6B and 6D illustrate the two cases above. Two memory locations, 602 and 612 are shown in FIGS. 6A and 6B, respectively. In FIGS. 6A-6B, Step 2, f=SIMD load &b[i]−S, (shown in FIG. 6A) and Step 2, f=SIMD load &b[i], (shown in FIG. 6B) are loading different data f 604 and s 606 in FIGS. 6A and f 614 and s 616 in FIG. 6B, but this does not matter as none of the values generated by the Step 2, f=SIMD load &b[i], is used in the final result, as it is part of the data prior to the first value that is used. In other words, while resulting vectors 608 in FIGS. 6A and 618 in FIG. 6B are different, only the last two data elements in these vectors are actually used, and these are the same for both vectors, namely b[1] and b[2]. The loads shown in FIG. 6A result in the data contained in load f 604 being discarded in its entirety. The process shown in FIG. 6B allows load 614 f to be avoided, which is desirable.

Figure 6C:
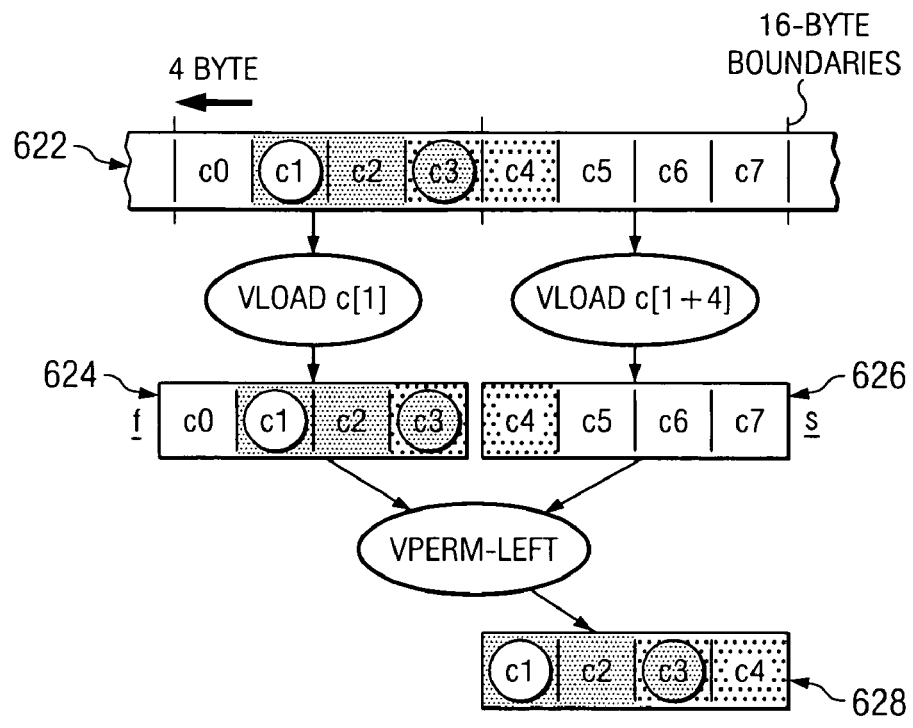
Figure 6D:
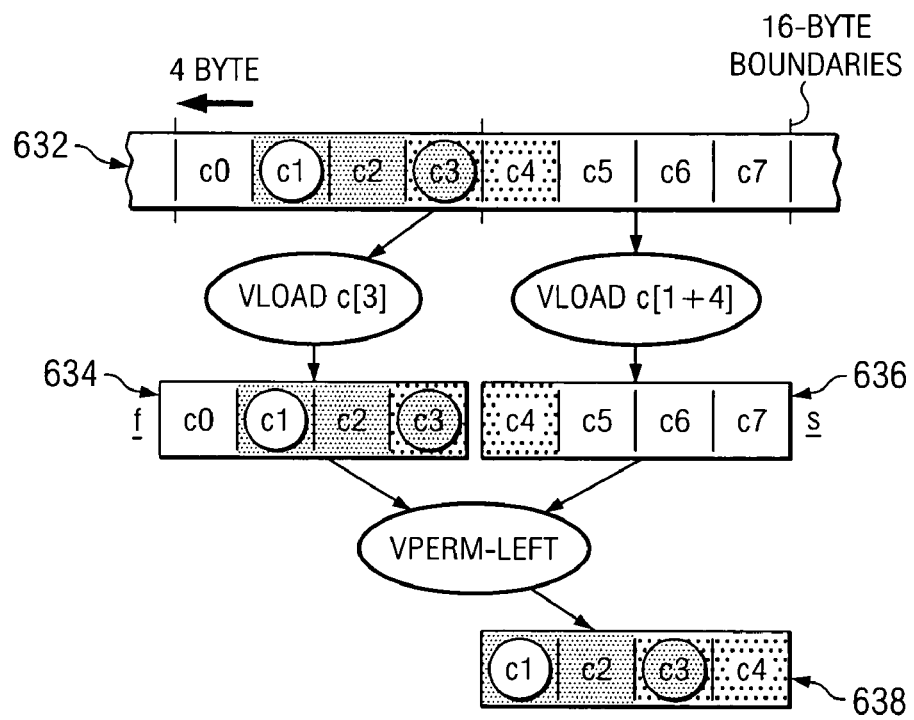

Two memory locations, 622 and 632 are shown in FIGS. 6C and 6D, respectively. In FIGS. 6C-D, Step 2, f=SIMD laod &b[i]−S, (shown in FIG. 6C) and Step 2, f=SIMD load &b[i], (shown in FIG. 6D) are loading the same data f 624 and s 626 in FIGS. 6C and f 634 and s 636 in FIG. 6D, which is fine. Here, both resulting vectors 628 in FIGS. 6C and 638 in FIG. 6D are identical, and only part of the vectors 628, 638 will be discarded, namely c[1] and c[2].

The same line of reasoning can be followed to correct the problem occurring for the last iteration of the loop (for example for the stream shown in FIGS. 5A and 5B) where it can be seen that the data accessed by Step 3, s=SIMD laod &b[i]−S+N,is not E-MPS-safe. Code is indicated below.

Step 1) Compute (possibly at runtime) prepend amount "S" for processing reference b[i] (see Peng Wu, Alexandre E. Eichenberger, Amy Wang, "Efficient SIMD Code Generation for Runtime Alignment and Length Conversion", $3^{rd}$ IEEE/ACM International Symposium on Code Generation and Optimization (CGO) 2005, 20-23 Mar. 2005, San Jose, Calif., USA, pp 153-164) which is hereby incorporated by reference in its entirety.

Step 2) f=SIMD load &b[i]−S.

Step 3) s=SIMD load &b[i=UB−1], where UB is the upper-bound of the original loop.

Step 4) Compute (possibly at runtime) the alignment of &b[i]−S, say A.

Step 5) Concatenate f and s, skip first A bytes, keep next N bytes. This is the result, where the data has been properly shifted, as shown by 608, 618, 628, and 638 in FIGS. 6A-D, respectively.

Note that the second SIMD load, in Step 3, is bounded to &b[i=UB−1] instead of the original &b[i]−S+N in the standard algorithm described above.

To summarize, the above algorithms may be used to prevent simdized memory references from being generated before the first or after the last simdized memory reference in the original loop. Thus, all references are safe using these two new algorithms.

1.4. Remaining Cases (Runtime with Conversions, Double Epilogue, or any Other Cases not Handled Above)

In the presence of data size conversion within a simdized expression, it is necessary to focus on a "virtual SIMD vector register" which may include several physical vector registers. For example, loading a vector of short (2-byte quantities) in a 16 byte vector yields 8 distinct values. If these values are converted to integers (4-byte quantities), then 2 physical vectors of 16 bytes each are needed to represent a "virtual" vector of these 8 shorts expanded to integers.

Figure 7:
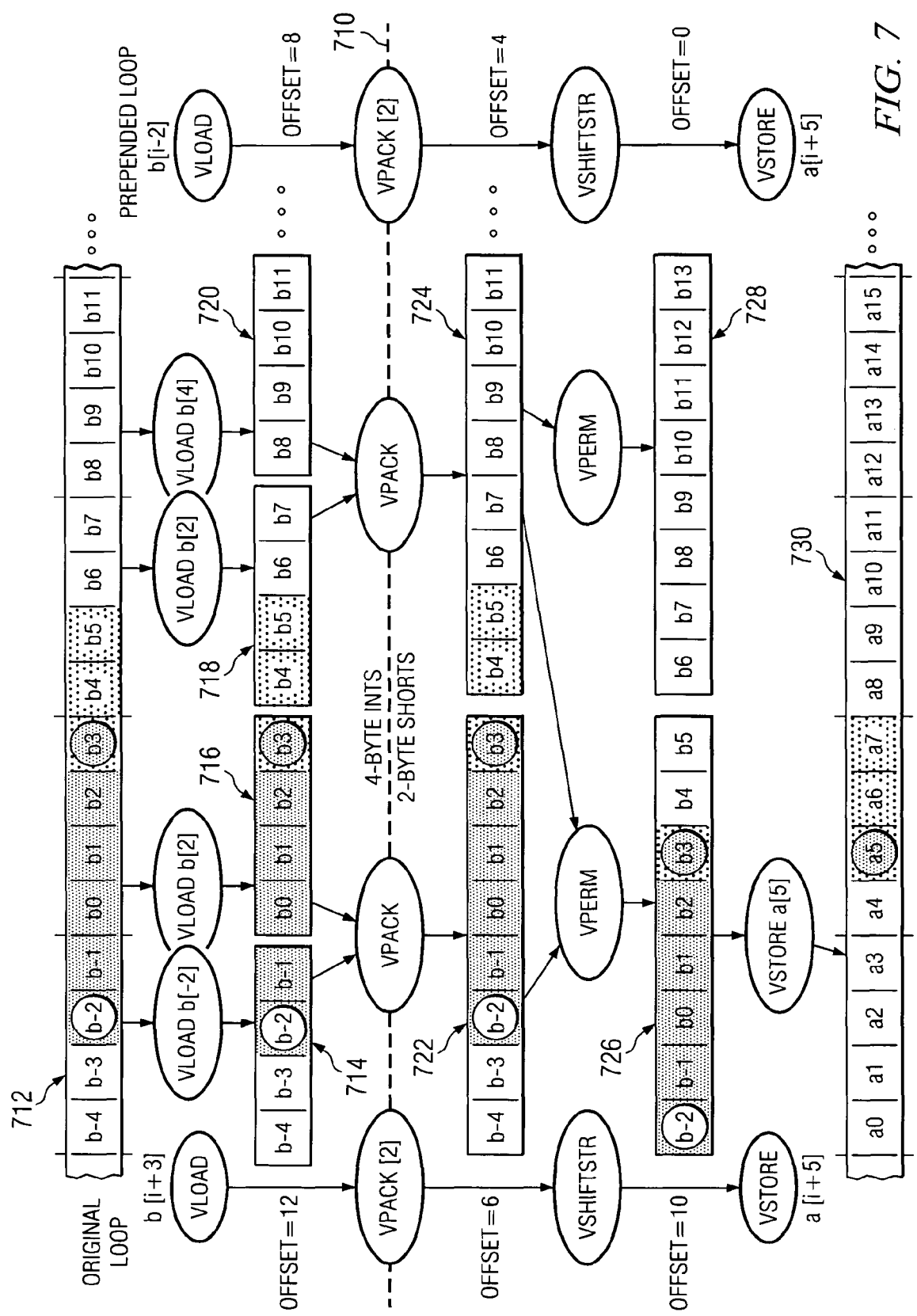
FIG. 7 is a diagram that schematically illustrates shifting data in the presence of data size conversion according to an exemplary embodiment of the present invention.

FIG. 7 is a diagram that schematically illustrates shifting data in the presence of data size conversion according to an exemplary embodiment of the present invention. In particular, FIG. 7 illustrates the conversion of an integer quantity (b[i+3]) into a short quantity (a[i+5]) with the associated data size conversion (vpack) and shift (vstreamshift). In this case, the "b" data is shifted left and thus, there may be MPS issues in the epilogue. Because of the fact, however, that 8 short fits into a physical register, virtual registers of 32 bytes need to be considered in the domains of integer (above the horizontal line 710 in FIG. 7). Because of this, 2 SIMD loads must be performed to load these 32 bytes. The data stored in the memory represented as 712 is vector loaded into vectors 714, 716, 718, and 720. Looking at vector 716, and taking b[0] as a reference, it is seen that data element b[3] is at offset 12. Vectors 714 and 716 are packed together to convert 4 byte integers to 2 byte shorts, resulting in vector 722. Looking at vector 722, and again taking b[0] as the reference point, it is seen that b[3] is now at offset 6. Vectors 718 and 720 are packed together to convert 4 byte integers to 2 byte shorts, resulting in vector 724. These two vectors, 722 and 724, are subjected to a virtual shift stream operation, VPERM, which shifts vector 722 four bytes (i.e. two short data elements) to the left, and appends the first four bytes (i.e. two data elements), resulting in vector 726. A similar VPERM operation is applied to vector 724 and the next packed vector (not shown), resulting in vector 728. Looking at vector 726, and taking b[−2] (the first element in vector 726) as the reference point, it can be seen that b[3] is now offset by 10 bytes (i.e. five data elements). Vector 726 is stored, VSTORE, at a[5]. As a result of the foregoing operations, shift-left may also have an MPS issue. For example in FIG. 7, the SIMD load b[−2], namely vector 714, results in a load that does not include any data touched by the original loop, and thus is an MPS liability. In contrast, while vector 716 contains some data which is not touched by the original loop, it does contain one data element that is used, namely b[3].

The solution in this case is to statically estimate an upper bound on the additional memory locations that may be accessed, and make sure that it is safe to access such memory locations. A safe, conservative estimate is that (with the above algorithm modification), each stream-shift may prepend up to a virtual vector length bytes of extra reads on either end. In general, the Virtual Vector Length (VVL) for a vector of data size S is N*S/Ssmall bytes, where N is the physical vector size, Ssmall is the smallest data type involved in the statement, and S is the data size of the vector currently under consideration. For epilogues that are doubled, the bound derived here must be doubled as well.

In summary, if for a given reference R, a bound X1 is found on the number of excess accesses in bytes that may occur during the prologue, then that memory reference is P-MPS-safe if it can be guaranteed at compile time that no memory protection boundary is crossed by accessing R minus X1 bytes. Similarly, if for the same reference R, a bound X2 is found on the number of excess accesses in bytes that may occur during the epilogue, that memory is E-MPS-safe if it can be guaranteed at compile time that no memory protection is crossed by accessing R plus X2 bytes.

If guarantees cannot be made about the data layout properties, it is necessary to investigate further using one of the two techniques described below.

Padding

When memory accesses cannot be determined as safe, then padding may be applied. There are several general techniques that can transform unsafe memory access into a safe one. For example, data layout can be altered so that static arrays that are touched by simdized loops are located sufficiently far from the end of their memory segments. That often does not require any memory overhead as the memory segment ends can be filled with data not touched by simdized loops. Similarly, heap memory can be padded by modifying the dynamic memory allocator (malloc) to never allocate variables next to the end of segments.

There are exceptions where this approach does not work, for example when pointer analysis cannot determine where a pointer may come from and a nonstandard/user specified malloc routine is used; or, for example, when users explicitly allocate memory segment and variables.

Memory Access Guarding

When there are remaining unsafe memory accesses (due to runtime alignment and conversion, double epilogue, or any other reasons), each of the unsafe memory accesses needs to be guarded. This guarding can be done using one of two techniques. In the first, we predicate the memory operation itself with a predicate; if that predicate is true, then the operation proceeds normally; otherwise, the operation is squashed so that no value is produced and, more importantly, no memory error is reported. The second technique is used for machines without predicated execution support. In such a case, one can use a select operation on the address of the data being loaded. If the predicate is true, the memory operation proceeds with the proper address; otherwise, it proceeds from a safe (possibly dummy) location. While the two techniques are semantically different, in general, they both result in the same outcome in this particular application.

Consider the memory reference &b[i]−S+x*N which would be generated when loading the xth part of a virtual vector for a stream prepended by S bytes. Without knowing the actual value of S, it is not possible at compile time to determine if this value will touch an out of bound memory vector or not.

Thus, it is necessary to predicate this load. Consider the prologue first. Using predicated execution of the load, one could simply conditionally execute:

SIMD load of &b[i]−S+x*N" if (&b[i]−S+x*N)&~0xF >= &b[i] & ~0xF), namely if the truncated address of &b[i]−S+x*N is no smaller than the truncated address of &b[i]. The value of i is set to the original loop lower bound.

A simpler test, however, is to select the larger address of first &b[i] and second &b[i]−S+x*N, because of the following observation. When the first address is the smallest of the two addresses, then that first address is not used since we are loading from the largest of the two addresses. When the first address is largest of the two addresses, then this is a situation where we want to access the data residing at first address. Thus, we can have an unconditional SIMD load as follows:

SIMD load of &b[i]+Max(0,−S+x*N), where, again, the value of i is set to the original loop lower bound. Similarly, in the epilogue, one can conditionally select the smaller address of &b[i=UB−1] and &b[i]−S+x*N. Namely, one can use either of the following two statements:

SIMD load of &b[i]−S+x*N" if (&b[i]−S+x*N)&~0xF >= &b[i=UB−1] & ~0xF)
SIMD load of Min(&b[i]−S+x*N, &b[i=UB−1])

where the value of i is the value of the loop index as it exits the simdized (blocked) loop.

The above &b[i]−S+x*N address format, seen in the context of the virtual length vector due to data size conversion, is also directly applicable to the type of code generated by the double epilogue situation.

Figure 8:
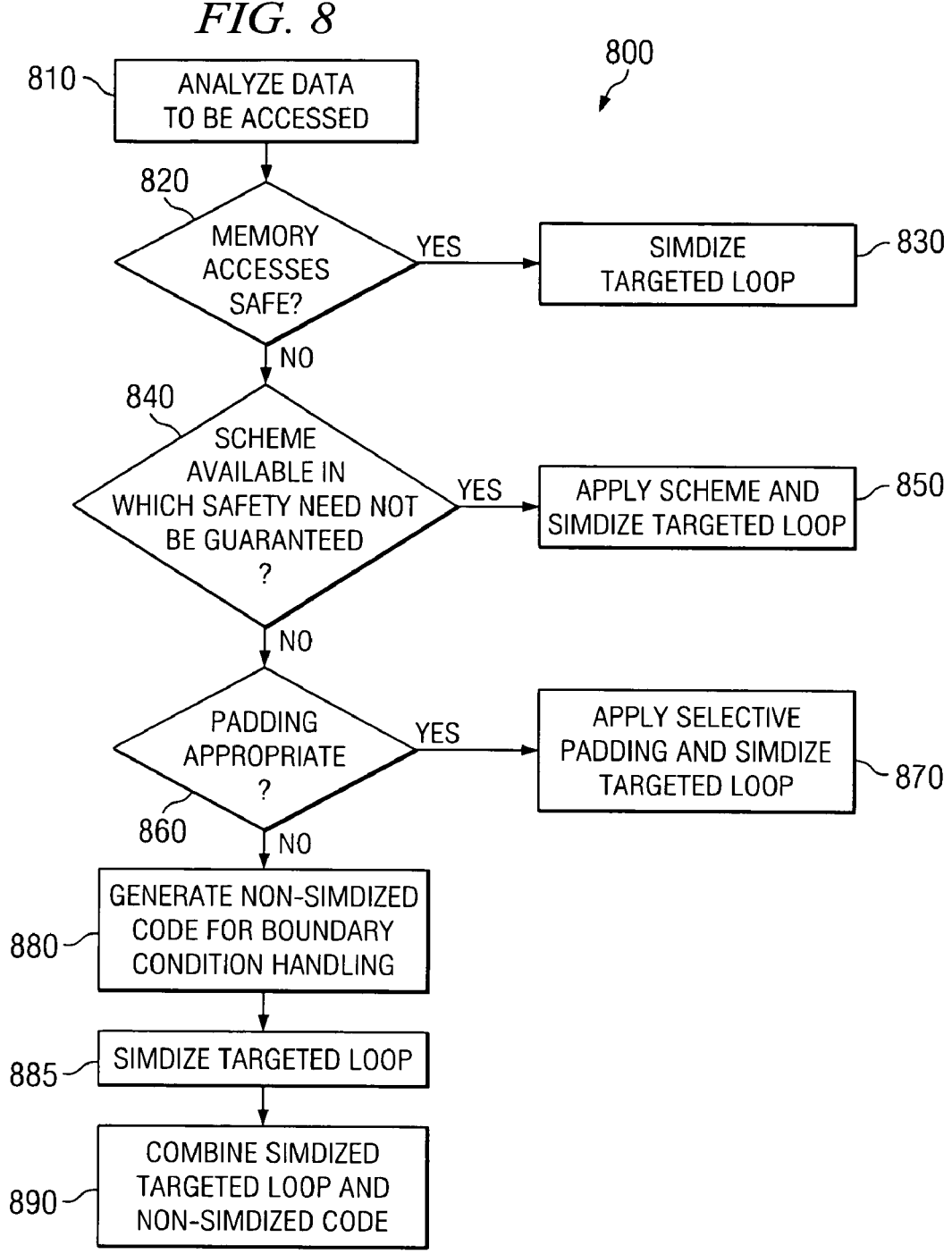
FIG. 8 is a flowchart that illustrates a method for automatically generating SIMD code according to an exemplary embodiment of the present invention.

FIG. 8 is a flowchart that illustrates a method for generating SIMD code according to an exemplary embodiment of the present invention. The method is generally designated by reference number 800 and begins by analyzing data to be accessed by a targeted loop that includes at least one statement, where each statement has at least one memory reference (Step 810). Based on the analysis, a determination is made whether memory accesses are safe (Step 820). Responsive to a determination that memory accesses are safe ("Yes" output of Step 820), the targeted loop is simdized (Step 830). Responsive to a determination that memory accesses are not safe ("No" output of Step 820), it is determined whether a scheme can be applied in which safety does not need to be guaranteed (Step 840). As described above, such schemes include performing a memory location analysis to determine if all of the memory references are relatively aligned, determining if alignment of the memory references can be determined statically if they are not relatively aligned, and determining whether modified stream shifting is appropriate if alignment cannot be determined statically. Responsive to a determination that a scheme in which safety does not need to be guaranteed can be applied ("Yes" output of Step 840), the scheme is applied and the targeted loop is simdized according to the applied scheme (Step 850). Responsive to a determination that a scheme in which safety does not need to be guaranteed cannot be applied ("No" output of Step 840), a determination is made whether padding is appropriate (Step 860). Responsive to a determination that padding is appropriate ("Yes" output of Step 860), the data is padded and the targeted loop is simdized (Step 870). Responsive to a determination that padding is not appropriate ("No" output of Step 860), non-simdized code is generated based on the targeted loop for handling boundary conditions (Step 880), the targeted loop is simdized (Step 885), and the simdized targeted loop is combined with the non-simdized code (Step 890). As described above, at least one of prologue sequential code and epilogue sequential code is generated to handle boundary conditions for safe execution in the presence of FS issues.

The present invention thus provides a computer implemented method, system and computer program product for automatically generating SIMD code, particularly in the presence of multi-threading and other false sharing conditions, and in machines having a segmented/virtual page memory protection system. A computer implemented method for automatically generating SIMD code begins by analyzing data to be accessed by a targeted loop that includes at least one statement, where each statement has at least one memory reference, to determine whether memory accesses are safe. Responsive to a determination that memory accesses are safe, the targeted loop is simdized. Responsive to a determination that memory accesses are not safe, it is determined whether a scheme can be applied in which safety does not need to be guaranteed. Responsive to a determination that a scheme in which safety does not need to be guaranteed can be applied, the scheme is applied and the targeted loop is simdized according to the applied scheme. Responsive to a determination that a scheme in which safety does not need to be guaranteed cannot be applied, a determination is made whether padding is appropriate. Responsive to a determination that padding is appropriate, the data is padded and the targeted loop is simdized. Responsive to a determination that padding is not appropriate, non-simdized code is generated based on the targeted loop for handling boundary conditions, the targeted loop is simdized, and the simdized targeted loop is combined with the non-simdized code.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The computer-usable medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for automatically generating SIMD code, comprising:
    analyzing, by a processing unit, data to be accessed by a targeted loop, the targeted loop comprising at least one statement, each at least one statement having at least one memory reference, to determine whether memory accesses are both memory protection system safe and false sharing safe;
    responsive to a determination that memory accesses are both memory protection system safe and false sharing safe, simdizing the targeted loop;
    responsive to a determination that memory accesses are not both memory protection system safe and false sharing safe, determining whether a scheme can be applied in which safety does not need to be guaranteed;
    responsive to a determination that a scheme in which safety does not need to be guaranteed can be applied, applying the scheme and simdizing the targeted loop according to the applied scheme;
    responsive to a determination that a scheme in which safety does not need to be guaranteed cannot be applied, determining whether padding is appropriate;
    responsive to a determination that padding is appropriate, padding the data and simdizing the targeted loop; and
    responsive to a determination that padding is not appropriate, generating non-simdized code based on the targeted loop for handling boundary conditions, simdizing the targeted loop, and combining the simdized targeted loop with the non-simdized code.

2. The computer implemented method according to claim 1, wherein generating non-simdized code based on the targeted loop for handling boundary conditions comprises:
    generating at least one of prologue sequential code and epilogue sequential code to handle boundary conditions in the presence of false sharing conditions.

3. The computer implemented method according to claim 2, wherein generating at least one of prologue sequential code and epilogue sequential code comprises:
    generating prologue sequential code only when memory accesses are not safe for an initial set of iterations of the original targeted loop, and generating epilogue sequential code only when memory accesses are not safe for a final set of iterations of the original targeted loop.

4. The computer implemented method according to claim 2, wherein generating at least one of prologue sequential code and epilogue sequential code comprises:
    copying each necessary statement from the targeted loop and distributing each such copied statement within each of the at least one of the prologue sequential code and the epilogue sequential code to corresponding distinct loops and causing each distinct loop to iterate precisely over an appropriate number of iterations for that loop's copied statement.

5. The computer implemented method according to claim 2, wherein generating at least one of prologue sequential code and epilogue sequential code comprises:
    copying each necessary statement from the targeted loop and generating a single loop for each of the at least one of the prologue sequential code and the epilogue sequential code wherein each such single loop contains each copied statement and further contains, for each copied statement, a corresponding conditional statement guarding the copied statement, each such conditional statement comprising a condition that determines precisely which iteration of the copied statement guarded by that conditional statement is executed.

6. The computer implemented method according to claim 2, wherein generating at least one of prologue sequential code and epilogue sequential code comprises:
    copying each necessary statement from the targeted loop and generating a single loop for each of the at least one of the prologue sequential code and the epilogue sequential code wherein each such single loop contains each copied statement and further contains, only for each copied statement for which re-execution of that statement would affect an outcome of the targeted loop, a corresponding conditional statement guarding the copied statement, each such conditional statement comprising a condition that determines precisely which iteration of the copied statement guarded by that conditional statement is executed.

7. The computer implemented method according to claim 1, wherein the scheme comprises:
    performing a memory location analysis to determine if all of the memory references are relatively aligned; and
    responsive to a determination that all of the memory references are relatively aligned, simdizing the targeted loop.

8. The computer implemented method according to claim 7, wherein the scheme further comprises:

responsive to a determination that all of the memory references are not relatively aligned, determining whether alignment of the memory references can be determined statically; and responsive to a determination that alignment of the memory references can be determined statically, simdizing the targeted loop using statically determined memory references to prevent unnecessary loads.

9. The computer implemented method according to claim 8, wherein the scheme further comprises:

responsive to a determination that alignment of the memory references cannot be determined statically, determining whether modified stream shifting is appropriate;

responsive to a determination that modified stream shifting is appropriate, simdizing the targeted loop;

responsive to simdizing the targeted loop, determining which statements within the targeted loop include a stream shifting operation; and responsive to determining which statements within the targeted loop include a stream shifting operation, modifying each such statement in a first and last simdized iteration of the simdized targeted loop by replacing each stream shifting operation within each such statement with a modified stream shifting operation that results in one of a first safe situation in which any data located in any memory reference accessed by the modified stream shifting operation is actually used and is guaranteed to be safe, and a second safe situation in which any data located in any memory reference accessed by the modified stream shifting operation is discarded without having an adverse impact on any result of the simdized targeted loop.

10. The computer implemented method according to claim 1, wherein generating non-simdized code based on the targeted loop for handling boundary conditions comprises:

applying memory access guarding to at least one of a prologue statement and an epilogue statement for handling boundary conditions in the presence of a memory protection support system.

11. A computer program product, comprising:

a computer readable storage medium storing computer usable program code configured for automatically generating SIMD code, the computer usable program code comprising:

computer usable program code configured for analyzing data to be accessed by a targeted loop, the targeted loop comprising at least one statement, each at least one statement having at least one memory reference, to determine whether memory accesses are both memory protection system safe and false sharing safe;

computer usable program code configured for simdizing the targeted loop in response to a determination that memory accesses are both memory protection system safe and false sharing safe;

computer usable program code configured for determining whether a scheme can be applied in which safety does not need to be guaranteed in response to a determination that memory accesses are not both memory protection system safe and false sharing safe;

computer usable program code configured for applying the scheme and simdizing the targeted loop according to the applied scheme in response to a determination that a scheme in which safety does not need to be guaranteed can be applied;

computer usable program code configured for determining whether padding is appropriate in response to a determination that a scheme in which safety does not need to be guaranteed cannot be applied;

computer usable program code configured for padding the data and simdizing the targeted loop in response to a determination that padding is appropriate; and computer usable program code configured for generating non-simdized code based on the targeted loop for handling boundary conditions, simdizing the targeted loop, and combining the simdized targeted loop with the non-simdized code, in response to a determination that padding is not appropriate.

12. The computer program product according to claim 11, wherein the computer usable program code configured for generating non-simdized code based on the targeted loop for handling boundary conditions comprises:

computer usable program code configured for generating at least one of prologue sequential code and epilogue sequential code to handle boundary conditions in the presence of false sharing conditions.

13. The computer program product according to claim 12, wherein the computer usable program code configured for generating at least one of prologue sequential code and epilogue sequential code comprises:

computer usable program code configured for generating prologue sequential code only when memory accesses are not safe for an initial set of iterations of the original targeted loop, and generating epilogue sequential code only when memory accesses are not safe for a final set of iterations of the original targeted loop.

14. The computer program product according to claim 12, wherein the computer usable program code configured for generating at least one of prologue sequential code and epilogue sequential code comprises:

computer usable program code configured for copying each necessary statement from the targeted loop and distributing each such copied statement within each of the at least one of the prologue sequential code and the epilogue sequential code to corresponding distinct loops and causing each distinct loop to iterate precisely over an appropriate number of iterations for that loop's copied statement.

15. The computer program product according to claim 12, wherein the computer usable program code configured for generating at least one of prologue sequential code and epilogue sequential code comprises:

computer usable program code configured for copying each necessary statement from the targeted loop and generating a single loop for each of the at least one of the prologue sequential code and the epilogue sequential code wherein each such single loop contains each copied statement and further contains, for each copied statement, a corresponding conditional statement guarding the copied statement, each such conditional statement comprising a condition that determines precisely which iteration of the copied statement guarded by that conditional statement is executed.

16. The computer program product according to claim 12, wherein the computer usable program code configured for generating at least one of prologue sequential code and epilogue sequential code comprises:

computer usable program code configured for copying each necessary statement from the targeted loop and generating a single loop for each of the at least one of the prologue sequential code and the epilogue sequential code wherein each such single loop contains each copied statement and further contains, only for each copied statement for which re-execution of that statement would affect an outcome of the targeted loop, a corresponding conditional statement guarding the copied statement, each such conditional statement comprising a condition that determines precisely which iteration of the copied statement guarded by that conditional statement is executed.

17. The computer program product according to claim 11, wherein the computer usable program code configured for applying the scheme and simdizing the targeted loop according to the applied scheme comprises:
   computer usable program code configured for performing a memory location analysis to determine if all of the memory references are relatively aligned; and
   computer usable program code configured for simdizing the targeted loop in response to a determination that all of the memory references are relatively aligned.

18. The computer program product according to claim 17, wherein the computer usable program code configured for applying the scheme and simdizing the targeted loop according to the applied scheme further comprises:
   computer usable program code configured for determining whether alignment of the memory references can be determined statically in response to a determination that all of the memory references are not relatively aligned; and
   computer usable program code configured for simdizing the targeted loop using statically determined memory references to prevent unnecessary loads in response to a determination that alignment of the memory references can be determined statically.

19. The computer program product according to claim 18, wherein the computer usable program code configured for applying the scheme and simdizing the targeted loop according to the applied scheme further comprises:
   computer usable program code configured for determining whether modified stream shifting is appropriate in response to a determination that alignment of the memory references cannot be determined statically;
   computer usable program code configured for simdizing the targeted loop in response to a determination that modified stream shifting is appropriate;
   computer usable program code configured for determining which statements within the targeted loop include a stream shifting operation in response to simdizing the targeted loop; and
   computer usable program code configured for, in response to determining which statements within the targeted loop include a stream shifting operation, modifying each such statement in a first and last simdized iteration of the simdized targeted loop by replacing each stream shifting operation within each such statement with a modified stream shifting operation that results in one of a first safe situation in which any data located in any memory reference accessed by the modified stream shifting operation is actually used and is guaranteed to be safe, and a second safe situation in which any data located in any memory reference accessed by the modified stream shifting operation is discarded without having an adverse impact on any result of the simdized targeted loop.

20. The computer program product according to claim 11, wherein the computer usable program code configured for generating non-simdized code based on the targeted loop for handling boundary conditions comprises:
   computer usable program code configured for applying memory access guarding to at least one of a prologue statement and an epilogue statement for handling boundary conditions in the presence of a memory protection support system.

21. A system for automatically generating SIMD code, comprising:
   a processing unit for analyzing data to be accessed by a targeted loop comprising at least one statement, each at least one statement having at least one memory reference;
   a simdizer for simdizing the targeted loop, wherein the simdizer simdizes the target loop in response to a determination by the processing unit that memory accesses are both memory protection system safe and false sharing safe;
   wherein, responsive to a determination by processing unit that memory accesses are not both memory protection system safe and false sharing safe, the processing unit determines whether a scheme can be applied in which safety does not need to be guaranteed;
   wherein, responsive to a determination by the processing unit that a scheme in which safety does not need to be guaranteed can be applied, the simdizer simdizes the targeted loop according to the scheme;
   wherein, responsive to a determination by the processing unit that a scheme in which safety does not need to be guaranteed cannot be applied, the processing unit determines whether padding is appropriate;
   a padding mechanism, responsive to a determination by the processing unit that padding is appropriate, for padding the data, wherein the simdizer simdizes the targeted loop in response to application of padding;
   a code generator, wherein responsive to a determination by the processing unit that padding is not appropriate, the code generator generates non-simdized code based on the targeted loop for handling boundary conditions, and wherein the simdizer simdizes the targeted loop; and
   a combining mechanism for combining the simdized targeted loop with the non-simdized code in response to generation of the non-simdized code and to the simdizer simdizing the targeted loop.

* * * * *